United States Patent
Barry et al.

(10) Patent No.: US 9,921,828 B2
(45) Date of Patent: Mar. 20, 2018

(54) MERGING VERSIONS OF AN INCLUSION APPLICATION THAT IS INCORPORATED INTO A MASTER APPLICATION

(71) Applicant: Oracle International Corporation, Redwood City, CA (US)

(72) Inventors: Andrew Barry, Canberra (AU); Davin Fifield, Canberra (AU)

(73) Assignee: Oracle International Corporation, Redwood Shores, CA (US)

( * ) Notice: Subject to any disclaimer, the term of this patent is extended or adjusted under 35 U.S.C. 154(b) by 1 day.

(21) Appl. No.: 15/269,124

(22) Filed: Sep. 19, 2016

(65) Prior Publication Data

US 2017/0083310 A1    Mar. 23, 2017

Related U.S. Application Data

(60) Provisional application No. 62/221,789, filed on Sep. 22, 2015.

(51) Int. Cl.
*G06F 9/44* (2006.01)

(52) U.S. Cl.
CPC . *G06F 8/71* (2013.01); *G06F 8/30* (2013.01)

(58) Field of Classification Search
None
See application file for complete search history.

(56) References Cited

U.S. PATENT DOCUMENTS

| 6,393,437 B1* | 5/2002 | Zinda | G06F 8/20 200/203 |
| 9,298,451 B2* | 3/2016 | Kaneko | G06F 8/71 |
| 9,720,688 B1* | 8/2017 | Green | G06F 8/71 |
| 2009/0271696 A1* | 10/2009 | Bailor | G06F 17/30873 715/229 |
| 2009/0292737 A1* | 11/2009 | Hayton | G06F 8/63 |
| 2013/0014083 A1* | 1/2013 | Martineau | G06F 8/71 717/122 |
| 2014/0006352 A1* | 1/2014 | Sachs | G06F 8/71 707/638 |

(Continued)

OTHER PUBLICATIONS

Git, About, Distributed, available at https://git-scm.com/about/distributed (last accessed on Aug. 15, 2016).

(Continued)

*Primary Examiner* — Rongfa P Wang
(74) *Attorney, Agent, or Firm* — Invoke (57) ABSTRACT

Techniques for merging versions of an inclusion application that is incorporated in a master application are disclosed. One version of an application may be stored as an application that is incorporated into another application. An application that is incorporated into another application may be referred to as an "inclusion application." An application incorporating another application may be referred to as a "master application." Additionally, a different version of the application may be stored as an application that is executed independently, without reference to other applications. A merging engine applies a set of conflict resolution rules to the two versions of the application to obtain a merged version of the application. The merging engine incorporates the merged version of the application in the master application.

20 Claims, 7 Drawing Sheets

(56) References Cited

U.S. PATENT DOCUMENTS

2016/0110189 A1* 4/2016 Hoy .......................... G06F 8/71
                                                    717/121

OTHER PUBLICATIONS

Git, About, Branching, available at https://git-scm.com/about/branching-and-merging (last accessed on Aug. 15, 2016).

* cited by examiner

MERGING VERSIONS OF AN INCLUSION APPLICATION THAT IS INCORPORATED INTO A MASTER APPLICATION

BENEFIT CLAIMS; INCORPORATION BY REFERENCE

This application claims the benefit of U.S. Provisional Patent Application 62/221,789, filed Sep. 22, 2015, which is hereby incorporated by reference.

TECHNICAL FIELD

The present disclosure relates to merging versions of an application. In particular, the present disclosure relates to merging versions of an inclusion application that is incorporated into a master application.

BACKGROUND

Individuals and/or entities may use applications to enforce a set of policies and/or rules. The application obtains input including a particular set of information. The application applies a policy and/or rule to the particular set of information in order to determine a particular outcome. As an example, an application may apply a set of policies to determine whether an applicant is eligible for welfare benefit. As another example, an application may apply a set of policies to compute a premium to be charged to a customer for an automobile insurance. As another example, an application may apply a set of rules to diagnose a patient with a particular disease.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. VERSION CONTROL SYSTEM ARCHITECTURE
3. MERGING VERSIONS OF AN INCLUSION APPLICATION THAT IS INCORPORATED INTO A MASTER APPLICATION
4. EXAMPLE EMBODIMENT
5. MISCELLANEOUS; EXTENSIONS
6. HARDWARE OVERVIEW

1. General Overview

One or more embodiments include merging versions of an inclusion application that is incorporated into a master application. An application includes a set of assets that define how a set of policies and/or rules is enforced. Users may generate multiple different versions of an application. One version of the application may be stored as an application that is incorporated into another application. An application that is incorporated into another application may be referred to as an "inclusion application." An application incorporating another application may be referred to as a "master application." By means of incorporating the inclusion application, the master application includes the assets of the inclusion application. Additionally, a different version of the application may be stored as an application that is executed independently, without reference to other applications. A merging engine applies a set of conflict resolution rules to the two versions of the application to obtain a merged version of the application. The merging engine incorporates the merged version of the application in the master application.

In an embodiment, the merging engine obtains the merged version of the application as described below. The merging engine identifies a modified version of a particular application, which is generated by updating assets of an initial version of the particular application. The modified version of the particular application is stored as an application that is executed independently. Additionally, the merging engine identifies a customized version of a master application, which includes a customized version of the particular application. The particular application may be referred to as an "inclusion application." The customized version of the inclusion application is generated by updating assets of the initial version of the inclusion application. The merging engine identifies conflicts between (a) updates in the modified version of the inclusion application and (b) updates in the customized version of the inclusion application. The merging engine identifies a conflict type of each conflict. The merging engine identifies a conflict resolution rule applicable to the conflict type of a particular conflict. Based on the conflict resolution rule, the merging engine determines whether to include a particular asset, associated with the particular conflict, into the merged version of the inclusion application. Additionally or alternatively, the merging engine determines which version of the particular asset to include into the merged version of the inclusion application.

One or more embodiments described in this Specification and/or recited in the claims may not be included in this General Overview section.

2. Architectural Overview

Figure 1:
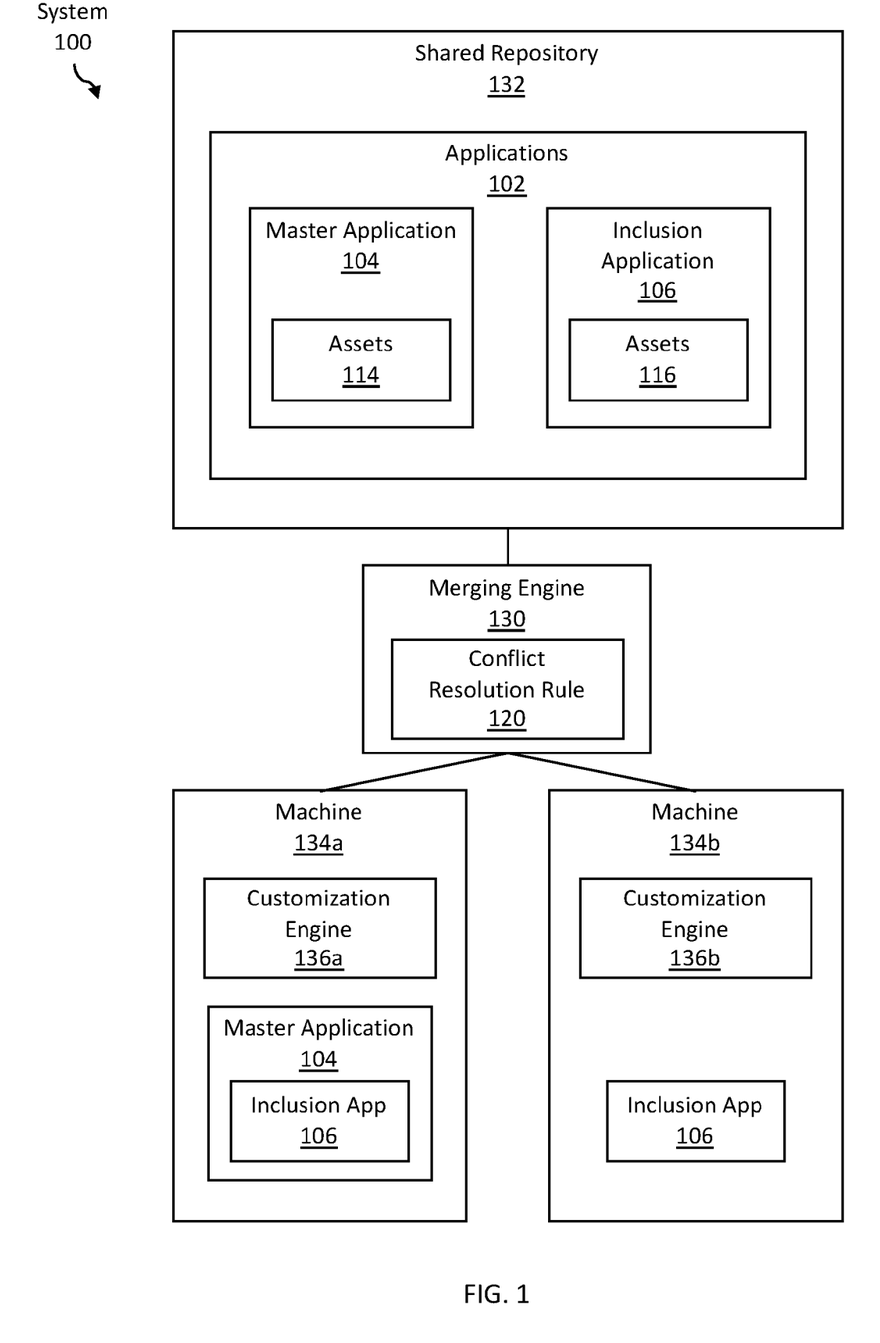
FIG. 1 illustrates a version control system, in accordance with one or more embodiments.

FIG. 1 illustrates a version control system 100, in accordance with one or more embodiments. As illustrated in FIG.

1, the system 100 includes a shared repository 132, applications 102, machines 134*a*-*b*, customization engines 136*a*-*b*, and a merging engine 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, an application 102 refers to hardware and/or software that is executed to enforce a set of policies and/or rules. The application 102 obtains input including a particular set of information. The input may be obtained via a user interface and/or from another application 102. Examples of user interfaces include a graphical user interface (GUI), a command line interface (CLI), a haptic interface, and a voice command interface. The application 102 applies a policy and/or rule to the particular set of information to determine a particular outcome. As an example, an application may apply a set of policies to determine whether an applicant is eligible for welfare benefits. As another example, an application may apply a set of policies to compute a premium to be charged to a customer for an automobile insurance. As another example, an application may apply a set of rules to diagnose a patient with a particular disease.

An application 102 includes one or more assets (such as assets 114 or assets 116). Each asset defines an as aspect and/or element of the application 102. Examples of assets are described below. Additional and/or alternative assets may be included in an application 102.

An asset may define a rule of an application 102. The application 102 applies the rule to a set of information in order to determine particular outcome. As an example, an application may apply a set of policies to determine whether an applicant is eligible for welfare benefits. A rule of the application may be used to determine a maximum household income, for the applicant, for qualifying for welfare benefits. The rule may determine the maximum household income based on a household size of the applicant. Another rule of the application may be used to determine whether the applicant's income is above the maximum household income. One application 102 may include multiple assets, each defining a rule applied by the application 102.

An asset may define a screen definition of an application 102. A screen definition specifies one or more UI elements to be included in a user interface. The user interface is used to receive user input for use by the application 102. Additionally or alternatively, the user interface is used to present results determined by the application 102. Examples of UI elements include text, graphics, hyperlinks, checkboxes, radio buttons, dropdown lists, list boxes, buttons, toggles, text fields, date and time selectors, command lines, and sliders. One application 102 may include multiple assets, each defining a screen definition of the application 102.

An asset may define a user interface (UI) style of an application 102. As an example, a UI style may specify the color of text, buttons, or other UI elements. A UI style may specify the size of text, buttons, or other UI elements. A UI style may specify animations associated with text, buttons, or other UI elements. A UI style may specify a logo or other graphics to be included at a particular location of a user interface. One application 102 may include multiple assets, each defining a UI style of the application 102.

An application 102 may be executed independently, without reference to other applications 102. Additionally or alternatively, an application 102 may be incorporated into another application 102. An inclusion application 106 refers to an application that is incorporated into another application. A master application 104 refers to an application that incorporates another application. A master application 104, which incorporates an inclusion application 106, includes the assets of the inclusion application 106.

An example of a master application 104 and an inclusion application 106 is illustrated in FIG. 1. The inclusion application 106 includes assets 116. The master application includes assets 114. The master application 104 also incorporates the inclusion application 106. By means of incorporating the inclusion application 106, the master application 104 includes assets 116. Hence, the master application 104 includes both assets 114 and assets 116.

As another example, a Citizenship Application may apply a set of rules to determine whether a person is citizen. A Benefits Application may apply a set of rules to determine whether a person is eligible for welfare benefits. Based on state laws, a person may be eligible for welfare benefits if (a) the person is a citizen and (b) the household income is below a specified threshold value. The Benefits Application may incorporate the Citizenship Application to determine whether a person is citizen. The rules of the Citizenship Application may require that a person be resident in the United States for at least five years to be a citizen. Additionally, the Benefits Application may include additional rules for determining whether the household income is below the specified threshold. Hence, the Benefits Application includes both the rules of the Citizenship Application and its own set of rules. In this example, the Citizenship Application may be referred to as an inclusion application. The Benefits Application may be referred to as a master application.

A particular application may concurrently be a master application 106 and an inclusion application 104. As an example, Application A may incorporate Application B. Application A may include the assets of Application B. Meanwhile, Application X may incorporate Application A. Application X may include the assets of Application A and the assets of Application B. In this example, Application A is both a master application and an inclusion application. Application A is a master application with respect to Application B. Application A is an inclusion application with respect to Application X.

In one or more embodiments, a machine (such as machines 134*a*-*b*) refers to hardware and/or software that is used for storing and/or editing a particular version of an application 102. The machine obtains the particular version of the application 102 from a shared repository 132. The machine stores the particular version of the application 102 on a data repository, that is different than the shared repository 132, for editing purposes. After editing the particular version of the application 102, the machine generates a customized version of the application 102. The machine submits a request to update the application 102 stored on the shared repository 132 based on the customized version of the application 102.

One or more machines may be used to generate different versions of a same application 102. As illustrated, for example, machine 134*a* may be used for storing and/or editing the master application 104, which includes the inclusion application 106. Meanwhile, machine 134*b* may be used for storing and/or editing the inclusion application 106. In this example, machine 134a generates one version of the inclusion application 106. Machine 134b generates another version of the inclusion application 106.

Machine 134a and machine 134b may be different digital devices. Alternatively, machine 134a and machine 134b may be different virtual machines and/or software applications, which may execute on a same digital device or different digital devices.

The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a mainframe, a television, a content receiver, a set-top box, a printer, a mobile handset, a smartphone, and/or a personal digital assistant ("PDA").

Different machines may be managed by different individuals and/or entities. The different individuals and/or entities may desire to enforce a common set of policies and/or rules. As an example, a Citizenship Department may manage machine 134b. The Citizenship Department may use machine 134b to create a Citizenship Application, which is illustrated as the inclusion application 106. The citizenship laws may require that a person be resident in the United States for at least five years in order to be a citizen. Based on the citizenship laws, the Citizenship Application may include a rule that determines whether a person has been resident for at least five years.

Continuing the example, a Benefits Department may manage machine 134a. The Benefits Department may use machine 134a to create a Benefits Application, which is illustrated as the master application 104. The benefits laws may require that a person be a citizen in order to obtain welfare benefits. The Benefits Application may incorporate the Citizenship Application for determining whether a person is a citizen.

Continuing the example, there may be a change to the citizenship laws. The new citizenship laws may require that a person be resident in the United States for at least six years in order to be a citizen. The Citizenship Department may update the rule in the Citizenship Application. The updated rule may test whether a person has been resident for at least six years, instead of five years. The Benefits Department may desire that the new citizenship laws take effect in the Benefits Application. Since the Benefits Application incorporates the Citizenship Application, the updates to the Citizenship Application may be included in the Benefits Application. As described below, a merging engine may determine which updates to the Citizenship Application are included in the Benefits Application. In this example, the citizenship laws are a common set of policies and/or rules that are enforced by multiple departments.

Each machine implements a customization engine (such as customization engines 136a-b). A customization engine refers to hardware and/or software configured to edit, update, and/or customize an application 102. The customization engine may render a user interface for receiving user input specifying edits to an application 102. The customization engine may apply the edits to a particular version of the application 102 to generate a different version of the application 102.

In one or more embodiments, a shared repository 132 is any type of storage unit and/or device (e.g., a file system, database, collection of tables, or any other storage mechanism) for storing data. Further, a shared repository 132 may include multiple different storage units and/or devices. The multiple different storage units and/or devices may or may not be of the same type or located at the same physical site. Further, a shared repository 132 may be implemented or may execute on the same computing system as a merging engine 130. Alternatively or additionally, a shared repository 132 may be implemented or executed on a computing system separate from a merging engine 130. A shared repository 132 may be communicatively coupled to a merging engine 130 via a direct connection or via a network.

In an embodiment, a shared repository 132 stores applications 102 that are shared across multiple machines 134a-b. The machines may access the shared repository 132 over a network. Any machine may submit a read request to the shared repository 132 in order to retrieve a particular version of an application 102 that is stored on the shared repository 132. Additionally or alternatively, any machine may submit a write request to the shared repository 132 in order to write a particular version of an application 102 to the shared repository 132. The particular version of the application 102 that is written to the shared repository 132 may be determined by a merging engine 130.

In one or more embodiments, a merging engine 130 refers to hardware and/or software configured to perform operations described herein for merging versions of an inclusion application 106 that is incorporated into a master application 104. Examples of operations for merging versions of an inclusion application 106 that is incorporated into a master application 104 are described below with reference to FIGS. 2-3. A merging engine 130 may be implemented on one or more digital devices.

A merging engine 130 applies one or more conflict resolution rules 120 to conflicts between different versions of an inclusion application 106. The merging engine 130 applies the conflict resolution rules 120 to generate a merged version of an inclusion application 106. Based on the conflict resolution rules 120, the merged version of the inclusion application 106 may include an asset from one version of the inclusion application 106 and another asset from another version of the inclusion application 106.

Figure 2:
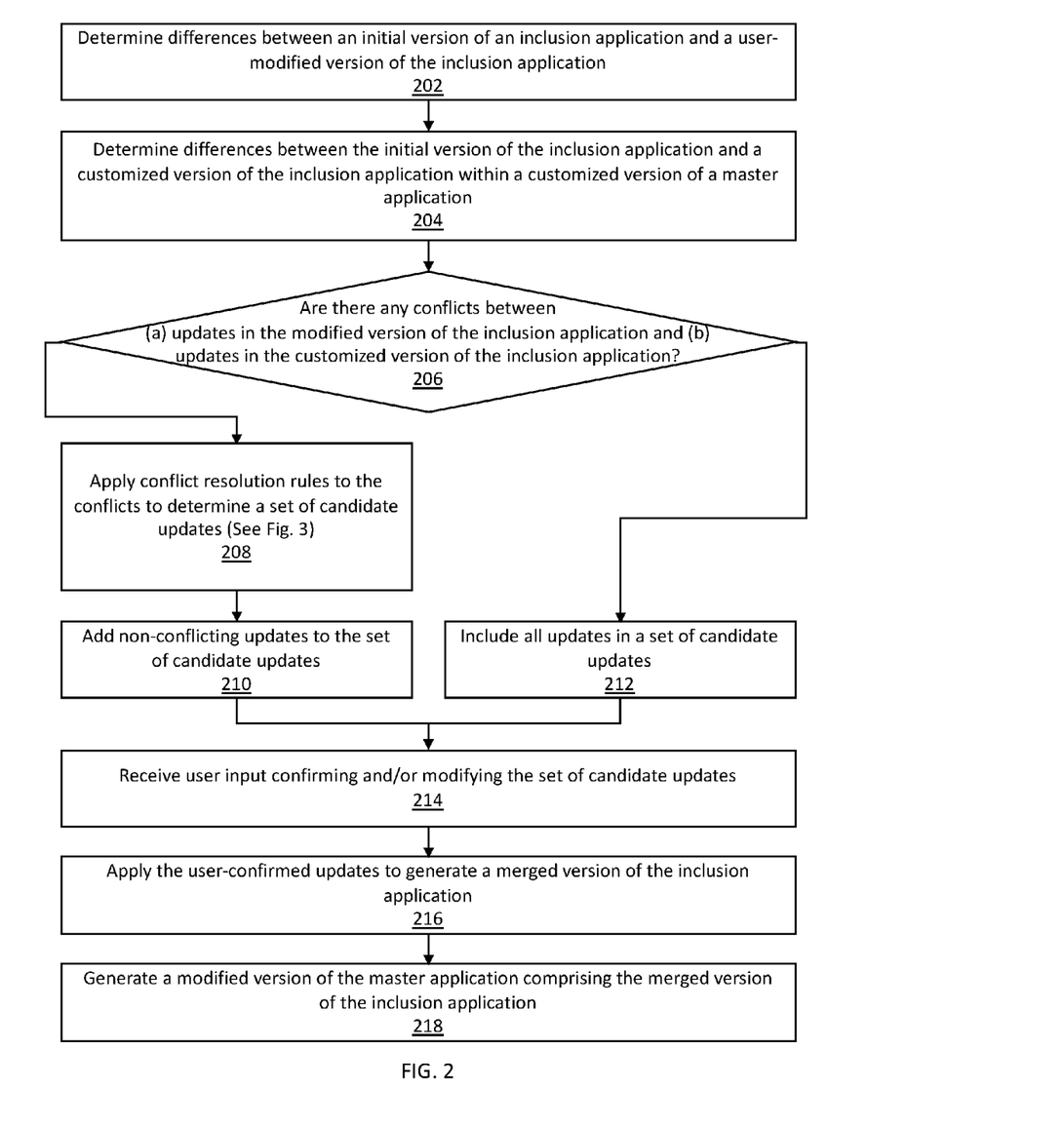
FIGS. 2-3 illustrate example sets of operations for merging versions of an inclusion application that is incorporated into a master application, in accordance with one or more embodiments.
Figure 3:
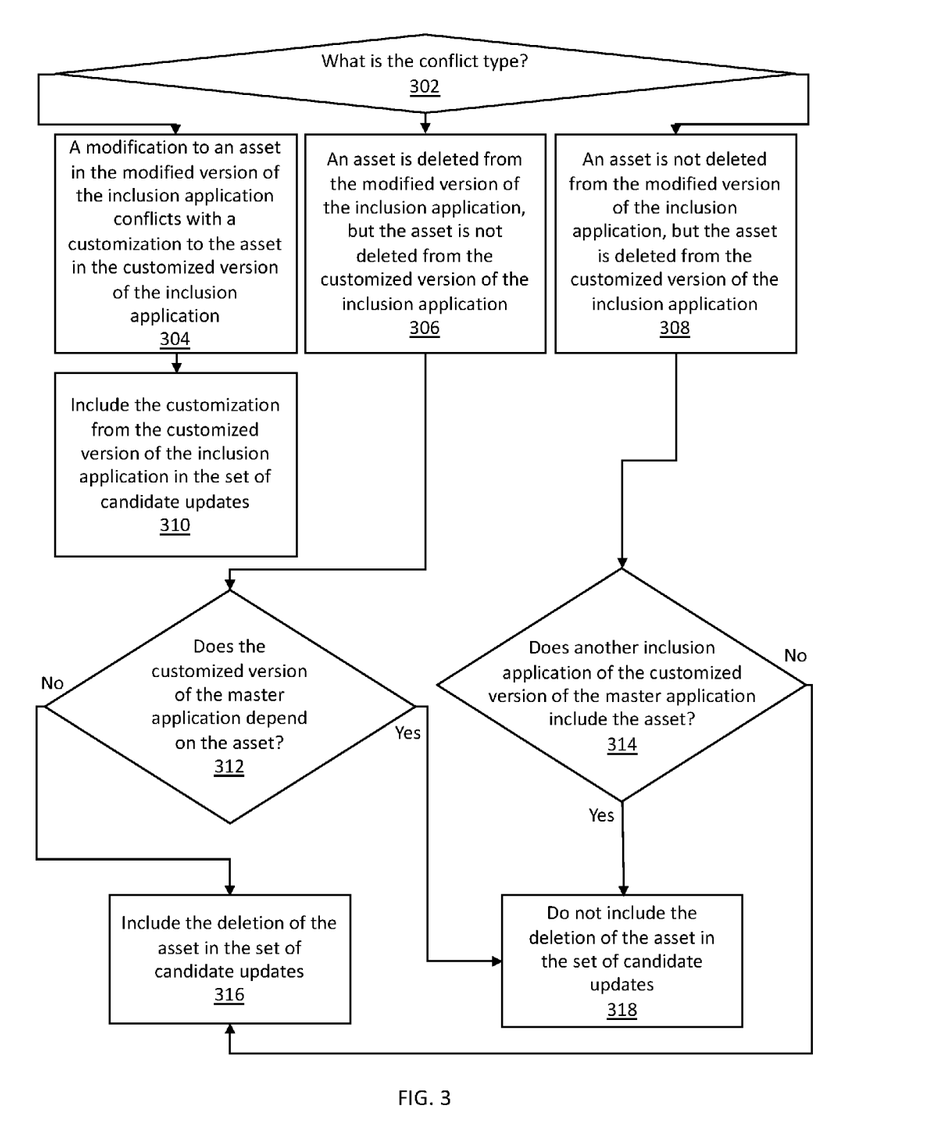

3. Merging Versions of an Inclusion Application that is Incorporated into a Master Application FIGS. 2-3 illustrate example sets of operations for merging versions of an inclusion application that is incorporated into a master application, in accordance with one or more embodiments. One or more operations illustrated in FIGS. 2-3 may be modified, rearranged, or omitted all together. Accordingly, the particular sequence of operations illustrated in FIGS. 2-3 should not be construed as limiting the scope of one or more embodiments.

One or more embodiments include determining differences between an initial version of an inclusion application and a modified version of the inclusion application (Operation 202). A merging engine identifies a modified version of an inclusion application, which is stored as an application that is executed independently. The modified version of the inclusion application is stored at a shared repository. The modified version of the inclusion application is generated by updating assets of an initial version of the inclusion application.

The merging engine determines differences between the initial version of the inclusion application and the modified version of the inclusion application. In an embodiment, the merging engine compares (a) assets of the initial version of the inclusion application and (b) assets of the modified version of the inclusion application. The merging engine identifies any differences between the assets of the two versions of the inclusion application. The differences between the assets are the updates that have been made to the initial version of the inclusion application in order to generate the modified version of the inclusion application. In another embodiment, metadata associated with the modified version of the inclusion application includes a list of updates that have been made to the initial version of the inclusion application in order to generate the modified version of the inclusion application. The merging engine identifies the updates based on the metadata.

One or more embodiments include determining differences between the initial version of the inclusion application and a customized version of the inclusion application within a customized version of a master application (Operation 204). The merging engine obtains a customized version of a master application, which comprises a customized version of the inclusion application. The merging engine obtains the customized version of the master application as part of a request to store the master application at the shared repository. Additionally or alternatively, the merging engine obtains the customized version of the master application as part of a request to update the master application that is stored at the shared repository. The merging engine receives the request to store and/or update the master application from a machine that has access to the shared repository. The customized version of the inclusion application, which is incorporated into the master application, is generated by updating assets of the initial version of the inclusion application.

The merging engine determines differences between the initial version of the inclusion application and the customized version of the inclusion application. In an embodiment, the merging engine compares (a) assets of the initial version of the inclusion application and (b) assets of the customized version of the inclusion application. The merging engine identifies any differences between the assets of the two versions of the inclusion application. The differences between the assets are the updates that have been made to the initial version of the inclusion application in order to generate the customized version of the inclusion application. In another embodiment, metadata associated with the customized version of the inclusion application includes a list of updates that have been made to the initial version of the inclusion application in order to generate the customized version of the inclusion application. Additionally or alternatively, metadata associated with the customized version of the master application includes a list of updates that have been made to the initial version of the inclusion application in order to generate the customized version of the inclusion application The merging engine identifies the updates based on the metadata.

Optionally, the merging engine may receive a query for any differences between (a) the customized version of the inclusion application in the customized version of the master application and (b) the modified version of the inclusion application. The query may be received via a user interface. The merging engine may identify the differences between (a) the customized version of the inclusion application and (b) the modified version of the inclusion application. The merging engine may display, at the user interface, the differences between (a) the customized version of the inclusion application and (b) the modified version of the inclusion application.

One or more embodiments include determining whether there any conflicts between (a) updates in the modified version of the inclusion application and (b) updates in the customized version of the inclusion application (Operation 206). The merging engine identifies the assets that have been updated in the modified version of the inclusion application. The merging engine identifies the assets that have been updated in the customized version of the inclusion application.

The merging engine determines if there are any assets that are included in both (a) the assets that have been updated in the modified version of the inclusion application and (b) the assets that have been updated in the customized version of the inclusion application. If there is a particular asset that is included in both (a) the assets that have been updated in the modified version of the inclusion application and (b) the assets that have been updated in the customized version of the inclusion application, then the merging engine determines whether the updates are to the particular asset are the same or different. If the updates are different, then the merging engine determines that there is a conflict associated with the particular asset.

As an example, a particular asset may define a color of a button displayed on a user interface. The particular asset, in the initial version of an inclusion application, may define the color of the button to be blue. The particular asset, in the modified version of an inclusion application, may update the color of the button to be red. The particular asset, in the customized version of an inclusion application, may update the color of the button to be yellow.

Continuing the example, a merging engine may determine that the particular asset is updated in both the modified version of the inclusion application and the customized version of the inclusion application. The updates in the two versions are different. The update in the modified version of the inclusion application changes the color to red, while the update in the customized version of the inclusion application changes the color to yellow. Hence, the merging engine may determine that there is a conflict, associated with the particular asset, between (a) updates in the modified version of the inclusion application and (b) updates in the customized version of the inclusion application.

The merging engine determines if there are any assets that have been deleted from the modified version of the inclusion application, but remain in the customized version of the inclusion application. The merging engine determines if there are any assets that remain in the modified version of the inclusion application, but have been deleted from the customized version of the inclusion application. The merging engine determines that there is a conflict associated with any such asset.

As an example, a particular asset may specify displaying a logo in a header of a user interface. The particular asset may be included in the initial version of an inclusion application. the particular asset may be deleted from the modified version of the inclusion application. The particular asset may remain in the customized version of the inclusion application.

Continuing the example, a merging engine may determine that the particular asset has been deleted from the modified version of the inclusion application, but remains in the customized version of the inclusion application. Hence, the merging engine may determine that there is a conflict, associated with the particular asset, between (a) updates in the modified version of the inclusion application and (b) updates in the customized version of the inclusion application.

If there are no conflicts, then the merging engine includes all updates in a set of candidate updates (Operation 212).

The merging engine identifies (a) the updates in the modified version of the inclusion application and (b) the updates in the customized version of the inclusion application. The merging engine includes all updates in the set of candidate updates. The set of candidate updates includes updates that may potentially be applied to generate a merged version of the inclusion application.

If there is at least one conflict between (a) updates in the modified version of the inclusion application and (b) updates in the customized version of the inclusion application, then the merging application applies one or more conflict resolution rules to the conflicts to determine a set of candidate updates (Operation 208). Examples of operations for applying conflict resolution rules are described below with reference to FIG. 3.

Referring to FIG. 3, one or more embodiments include determining a conflict type of a conflict (Operation 302). Examples of conflict types include:

(1) a conflict involving a modification to an asset in the modified version of the inclusion application that conflicts with a customization to the asset in the customized version of the inclusion application (Operation 304);

(2) a conflict involving an asset that is deleted from the modified version of the inclusion application, but is not deleted from the customized version of the inclusion application (Operation 306); and (3) a conflict involving an asset that is not deleted from the modified version of the inclusion application, but is deleted from the customized version of the inclusion application (Operation 308).

The merging engine may determine that the conflict involves a modification to an asset in the modified version of the inclusion application that conflicts with a customization to the asset in the customized version of the inclusion application (Operation 304). In this scenario, as described above, the merging engine determines that a particular asset is included in both (a) the assets that have been updated in the modified version of the inclusion application and (b) the assets that have been updated in the customized version of the inclusion application. A change to the asset in the modified version of the inclusion application may be referred to as a "modification." A change to the asset in the customized version of the inclusion application may be referred to as a "customization." The merging engine determines that there is a difference between (a) the modification to the particular asset in the modified version of the inclusion application and (b) the customization to the particular asset in the customized version of the inclusion application.

If the merging engine determines that a modification to an asset in the modified version of the inclusion application conflicts with a customization to the asset in the customized version of the inclusion application, then the merging engine includes the customization from the customized version of the inclusion application in the set of candidate updates (Operation 310).

As an example, a particular asset may specify the text to be displayed next to a particular text field. The particular asset, in the initial version of an inclusion application, may specify displaying the text "Address." The particular asset, in the modified version of the inclusion application, may specify displaying the text "Street Address." The particular asset, in the customized version of the inclusion application, may specify displaying the text "Residential Address."

Continuing the example, a merging engine may determine that there is a conflict associated with the particular asset. There is a difference between (a) the modification to the particular asset in the modified version of the inclusion application and (b) the customization to the particular asset in the customized version of the inclusion application. The merging engine may select the customization to the particular asset in the customized version of the inclusion application, rather than the modification to the particular asset in the modified version of the inclusion application. Hence, the merging engine may include the update to the particular asset that specifies displaying the text "Residential Address" in a set of candidate updates.

Alternatively, the merging engine may determine that the conflict involves an asset that is deleted from the modified version of the inclusion application, but is not deleted from the customized version of the inclusion application (Operation 306). In this scenario, the merging engine determines that the updates in the modified version of the inclusion application includes a deletion of a particular asset. The merging engine determines that the particular asset remains in the customized version of the inclusion application.

If the merging engine determines that an asset is deleted from the modified version of the inclusion application but is not deleted from the customized version of the inclusion application, then the merging engine determines whether the customized version of the master application depends on the asset (Operation 312). The merging engine identifies the asset that has been deleted from the modified version of the inclusion application (referred to as the "deleted asset"). The merging engine determines whether the deleted asset is used to generate an output. The merging engine determines whether the output from the deleted asset serves as an input to an asset of the customized version of the master application. If the output from the deleted asset serves as an input to an asset of the customized version of the master application, then the merging engine determines that there is a dependency on the deleted asset. Additionally or alternatively, if the output from the deleted asset is relied upon by the customized version of the master application, then the merging engine determines that there is a dependency on the deleted asset.

As an example, an asset may be a rule used for determining whether an individual should be diagnosed as obese. The asset produces an output that indicates whether the individual is obese. The asset may be deleted from a modified version of an inclusion application (referred to as the "deleted asset"). Meanwhile, the deleted asset may remain in a customized version of the inclusion application that is incorporated in a customized version of a master application.

Continuing the example, a merging engine may identify a particular asset in the customized version of the master application. The particular asset may be a rule used for designing an exercise plan for an individual. The exercise plan may be designed based on whether the individual is obese. The output generated by the deleted asset may serve as input to the particular asset in the customized version of the master application. The merging engine may determine that there is a dependency on the deleted asset.

As another example, an asset may be screen definition that defines a particular user interface. The asset may be deleted from a modified version of an inclusion application (referred to as the "deleted asset"). Meanwhile, the deleted asset may remain in a customized version of the inclusion application that is incorporated in a customized version of a master application.

Continuing the example, a merging engine may identify a particular asset in the customized version of the master application. The particular asset may be a screen definition that specifies displaying the text "Age" in the particular user interface, which is defined by the deleted asset. The output from the deleted asset (that is, the particular user interface) is relied upon by the customized version of the master application. The merging engine may determine that there is a dependency on the deleted asset.

If there is no dependency on the deleted asset, then the merging engine includes the deletion of the asset in the set of candidate updates (Operation 316).

If there is a dependency on the deleted asset, then the merging engine does not include the deletion of the asset in the set of candidate updates (Operation 318).

Alternatively, the merging engine may determine that the conflict involves an asset that is not deleted from the modified version of the inclusion application, but is deleted from the customized version of the inclusion application (Operation 308). In this scenario, the merging engine determines that the updates in the customized version of the inclusion application includes a deletion of a particular asset. The merging engine determines that the particular asset remains in the modified version of the inclusion application.

If the merging engine determines that an asset is not deleted from the modified version of the inclusion application but is deleted from the customized version of the inclusion application, then the merging engine determines whether another inclusion application of the customized version of the master application includes the asset (Operation 312). The merging engine identifies the asset that has been deleted from the customized version of the inclusion application (referred to as the "deleted asset"). The merging engine identifies all inclusion applications of the customized version of the master application. The merging engine identifies all assets of the inclusion applications of the customized version of the master application. The merging engine determines whether the deleted asset is included in the assets of the inclusion applications of the customized version of the master application.

If another inclusion application of the customized version of the master application includes the asset, then the merging engine does not include the deletion of the asset in the set of candidate updates (Operation 318).

If no other inclusion application of the customized version of the master application includes the asset, then the merging engine includes the deletion of the asset in the set of candidate updates (Operation 316).

Returning back to FIG. 2, one or more embodiments include adding non-conflicting updates to the set of candidate updates (Operation 210). The merging engine identifies the updates in the modified version of the inclusion application that do not conflict with any updates in the customized version of the inclusion application. The merging engine also identifies the updates in the customized version of the inclusion application that do not conflict with any updates in the modified version of the inclusion application. The merging engine adds the non-conflicting updates to the set of candidate updates.

Subsequent to determining the set of candidate updates at either Operation 210 or Operation 212, the merging engine receives user input confirming and/or modifying the set of candidate updates (Operation 214). The merging engine displays the set of candidate updates at a user interface. The merging engine receives user input confirming and/or modifying the set of candidate updates via the user interface.

One or more embodiments include applying the user-confirmed updates to generate a merged version of the inclusion application (Operation 216). The merging engine applies each update to the assets of the merged version of the inclusion application. An update may involve adding, deleting, and/or modifying an asset of the merged version of the inclusion application.

In an alternative embodiment, Operation 214 is not performed. After determining the set of candidate updates at either Operation 210 or Operation 212, the merging engine applies all candidate updates to generate the merged version of the inclusion application. Assets included in the merged version of the inclusion application are determined based on the conflict resolution rules described above with reference to FIG. 3, without further specification and/or confirmation via user input.

One or more embodiments include generating a modified version of the master application comprising the merged version of the inclusion application (Operation 218). The merging engine incorporates the merged version of the inclusion application into the modified version of the master application. The merging engine stores the modified version of the master application in the shared repository.

The shared repository may concurrently store: (a) a modified version of the inclusion application, and (b) a modified version of the master application comprising a merged version of the inclusion application. The modified version of the inclusion application is stored as an application that is executed independently. The merged version of the inclusion application is stored as an application that is incorporated into the master application. The merged version of the inclusion application is executed as part of the master application. The modified version of the inclusion application is different than the customized version of the inclusion application.

The shared repository may concurrently store multiple master applications, each comprising a different version of the inclusion application. One master application may comprise a particular customized version of the inclusion application, generated based on a particular set of updates. Another master application may comprise another customized version of the inclusion application, generated based on another set of updates. The two different customized versions of the inclusion application result in two different merged versions of the inclusion application. The different merged versions of the inclusion application are included respectively into the different master applications.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
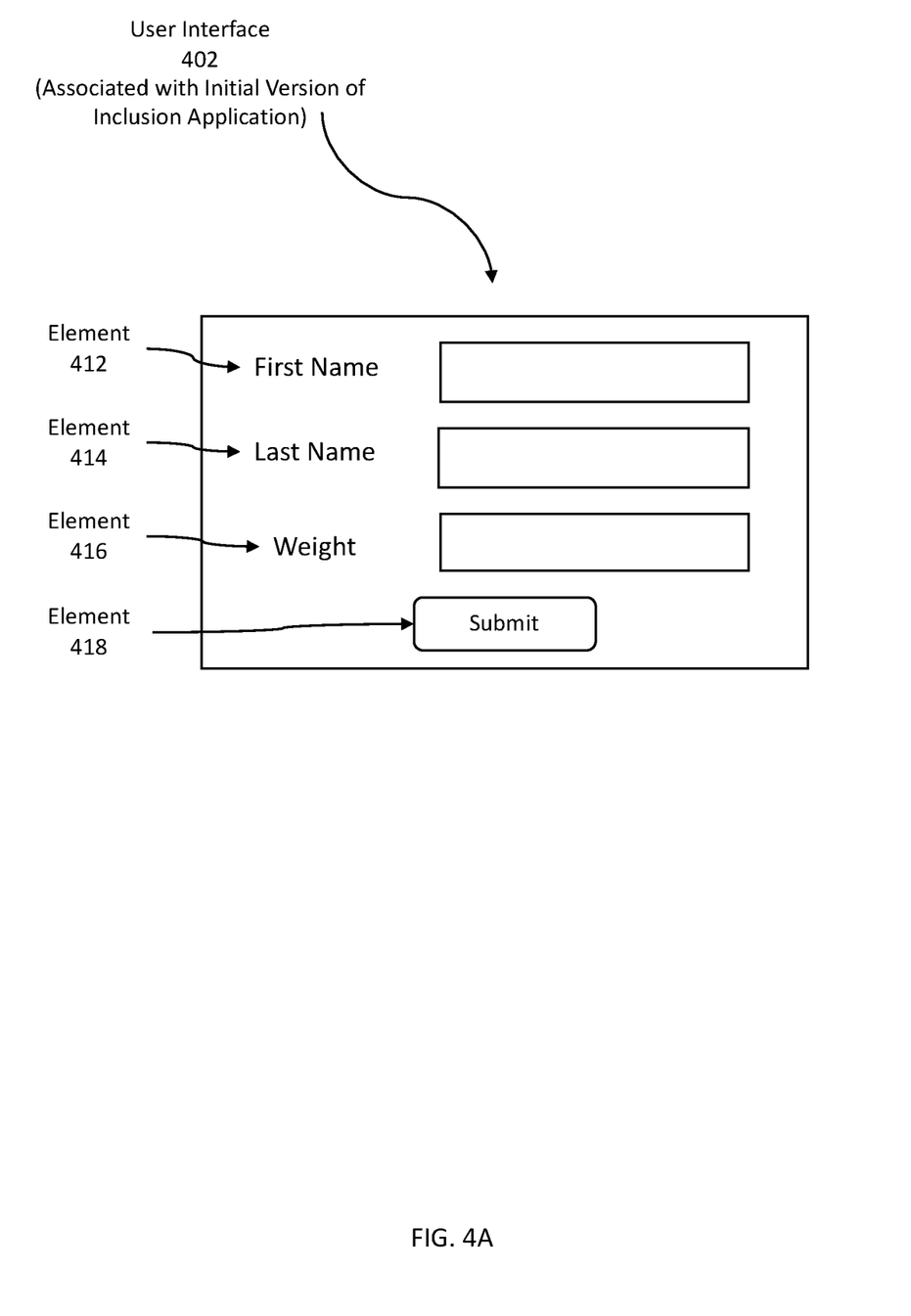
FIGS. 4A-C illustrate examples of user interfaces rendered based on different versions of an inclusion application.
Figure 4B:
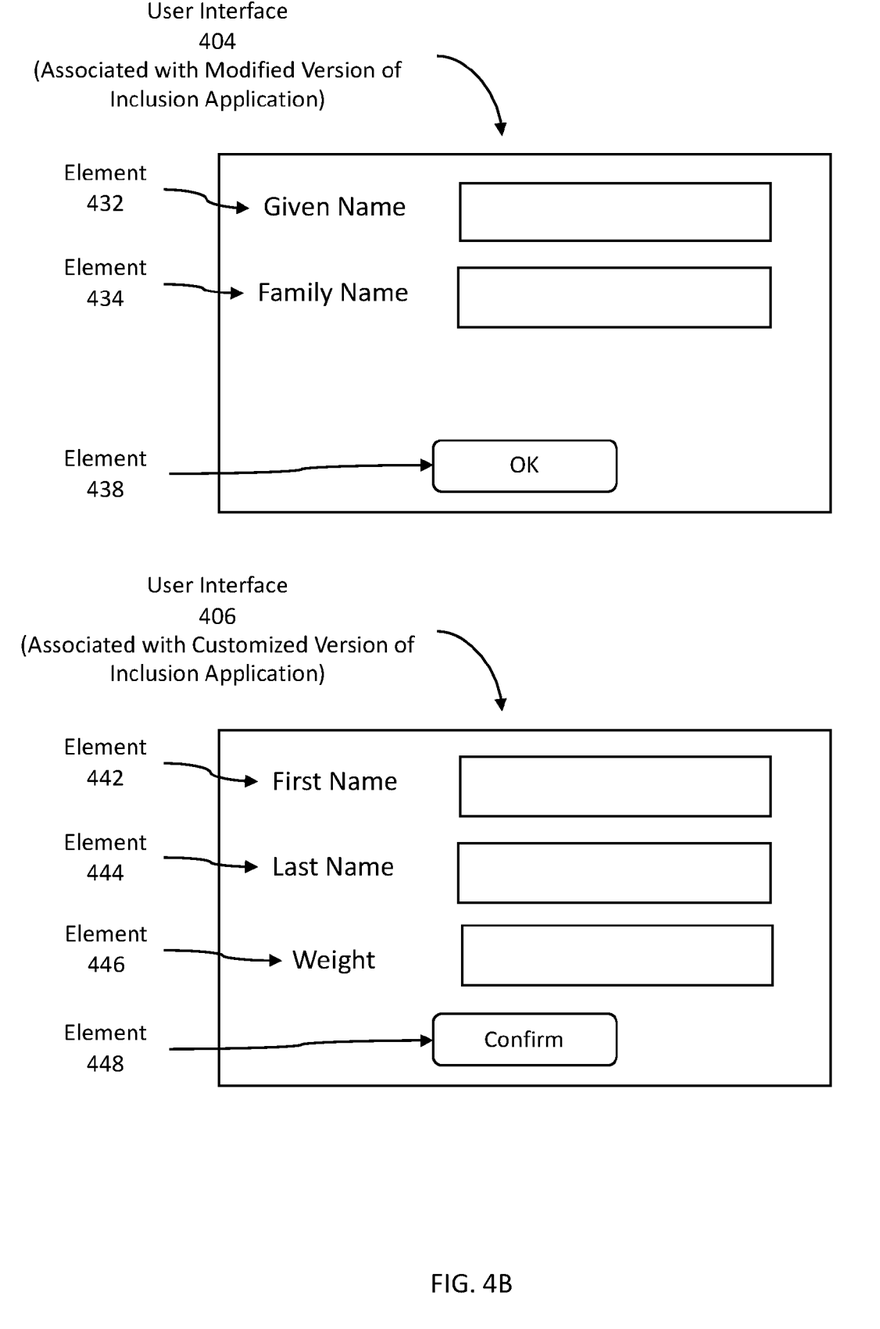
Figure 4C:
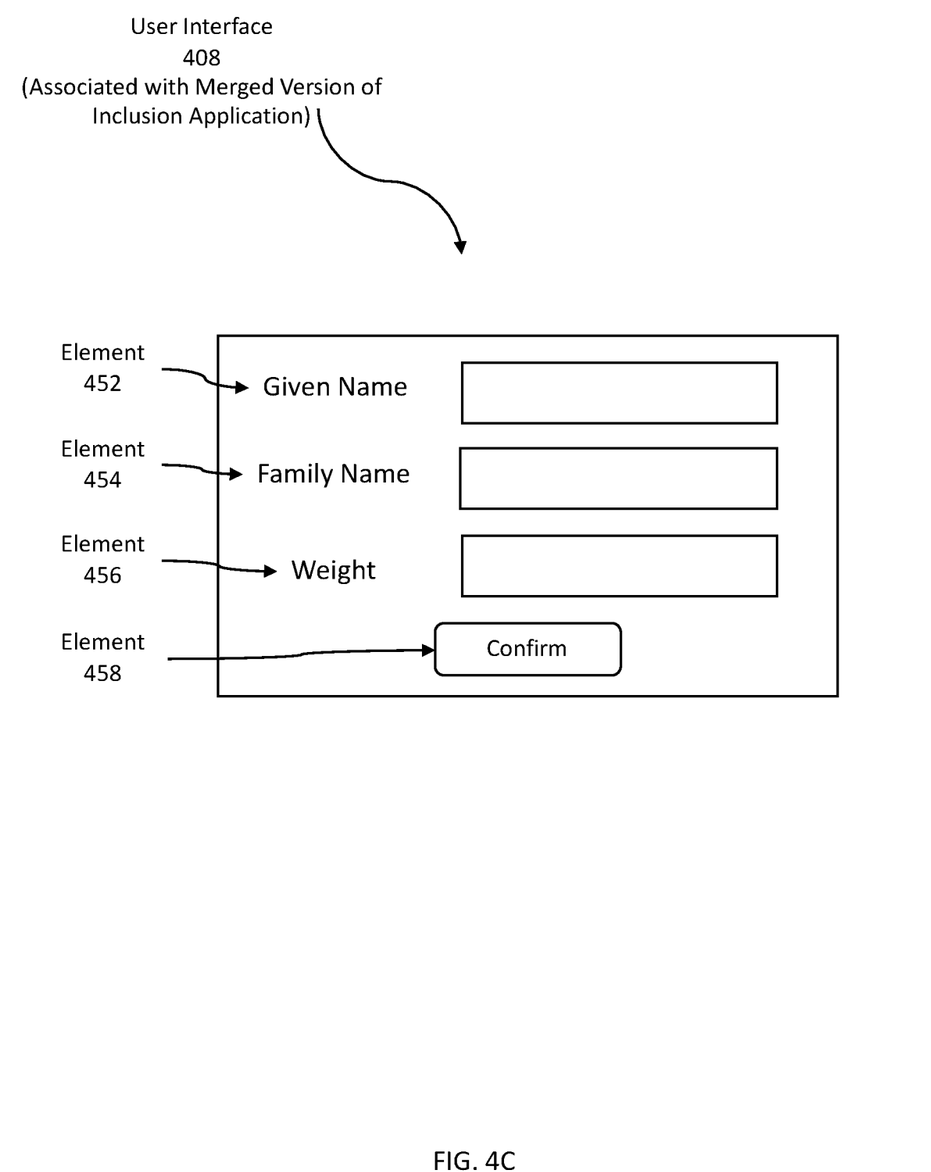

FIGS. 4A-C illustrate examples of user interfaces rendered based on different versions of an inclusion application. The inclusion application may be a Health Application that is used to evaluate an individual's health and wellbeing. A master application, comprising the Health Application, may be an Insurance Application that is used to determine insurance premiums to be charged to an individual.

The inclusion application (that is, the Health Application) executes to render a user interface that is used for collecting an individual's personal information. The following example relates to updates to the user interface that is used for collecting an individual's personal information.

Referring to FIG. 4A, an initial version of the inclusion application is executed to render user interface 402. Based on assets of the initial version of the inclusion application, elements 412-418 are displayed on user interface 402. Element 412 is the text "First Name," displayed next to a text field. Element 414 is the text "Last Name," displayed next to another text field. Element 416 is the text "Weight," displayed next to another text field. Element 418 is a button labeled with the text "Submit."

Referring to FIG. 4B, a modified version of the inclusion application is executed to render user interface 404. The modified version of the inclusion application is stored as an application that is executed independently. The modified version of the inclusion application is generated by updating the assets of the initial version of the inclusion application. As an example, a machine downloads an initial version of the inclusion application from a shared repository. The machine applies edits to the initial version of the inclusion application based on user input. The machine generates a modified version of the inclusion application, which is uploaded and stored on the shared repository.

Updates applied to the initial version of the inclusion application to generate the modified version of the inclusion application are as follows. An asset of the initial version of the inclusion application is updated to display the text "Given Name," rather than "First Name." Another asset of the initial version of the inclusion application is updated to display the text "Family Name," rather than "Last Name." Another asset of the initial version of the inclusion application is updated to delete the text "Weight" and the corresponding text field. Another asset of the initial version of the inclusion application is updated to display a button labeled with "OK," rather than "Submit."

Based on the assets of the modified version of the inclusion application, elements 432-438 are displayed on user interface 404. Element 432 is the text "Given Name," displayed next to a text field. Element 414 is the text "Last Name," displayed next to another text field. Element 416 is the text "Weight," displayed next to another text field. Element 418 is a button labeled with the text "Submit."

Further, a customized version of the inclusion application is executed to render user interface 406. The customized version of the inclusion application is stored as an application that is incorporated into a customized version of the master application. The customized version of the inclusion application is generated by updating the assets of the initial version of the inclusion application. As an example, a machine downloads an initial version of the inclusion application from a shared repository. The machine incorporates the initial version of the inclusion application into a master application. The machine applies edits to the initial version of the inclusion application, which is incorporated in the master application. The machine generates a customized version of the master application comprising a customized version of the inclusion application.

Updates applied to the initial version of the inclusion application to generate the customized version of the inclusion application are as follows. An asset of the initial version of the inclusion application is updated to display a button labeled with "Confirm," rather than "Submit."

Based on the assets of the customized version of the inclusion application, elements 442-448 are displayed on user interface 406. Element 442 is the text "First Name," displayed next to a text field. Element 444 is the text "Last Name," displayed next to another text field. Element 446 is the text "Weight," displayed next to another text field. Element 448 is a button labeled with the text "Confirm."

A merging engine identifies the differences between (a) the initial version of the inclusion application and (b) the modified version of the inclusion application. The merging engine identifies the differences between (a) the initial version of the inclusion application and (b) the customized version of the inclusion application.

The merging engine determines whether there are any conflicts between (a) the updates in the modified version of the inclusion application and (b) the updates in the customized version of the inclusion application.

The merging engine identifies the following conflicts between the updates:

(1) The element displaying the text "Weight" and the corresponding text field is deleted from the modified version of the inclusion application, but is not deleted from the customized version of the inclusion application; and (2) The button is modified to display the text "OK" in the modified version of the inclusion application, whereas the button is customized to display the text "Confirm" in the customized version of the inclusion application.

The merging engine identifies a conflict type of the first conflict. The first conflict involves an asset that is deleted from the modified version of the inclusion application, but is not deleted from the customized version of the inclusion application. The merging engine determines whether the customized version of the master application depends on the deleted asset. The merging engine determines that a rule included in the customized version of the master application uses the deleted asset. Specifically, the rule determines an insurance premium for an individual based on the individual's weight. Hence, the merging engine does not include the deletion of the asset in a set of candidate updates.

The merging engine identifies a conflict type of the second conflict. The second conflict involves a modification to an asset in the modified version of the inclusion application that conflicts with a customization to the asset in the customized version of the inclusion application. The merging engine includes the customization to the asset in the set of candidate updates.

The merging engine identifies the updates in the modified version of the inclusion application that do not conflict with any updates in the customized version of the inclusion application. The merging engine identifies the updates in the customized version of the inclusion application that do not conflict with any updates in the modified version of the inclusion application. The non-conflicting updates include:

(1) The element displaying the text "First Name" is updated to display the text "Given Name"; and (2) The element displaying the text "Last Name" is updated to display the text "Family Name."

The merging engine adds the non-conflicting updates to the set of candidate updates.

The merging engine displays the set of candidate updates at a user interface. The merging engine receives user input confirming the set of candidate updates.

The merging engine applies the user-confirmed updates to generate a merged version of the inclusion application. The merging engine generates a modified version of the master application comprising the merged version of the inclusion application. The merging engine stores the modified version of the master application at the shared repository.

Referring to FIG. 4C, the merged version of the inclusion application is executed to render user interface 408. The merged version of the inclusion application is stored as an application that is incorporated into the modified version of the master application. The merged version of the inclusion application is generated by merging (a) the updates in the modified version of the inclusion application and (b) the updates in the customized version of the inclusion application.

Based on the assets of the merged version of the inclusion application, which are determined at least in part based on the user-confirmed updates, elements 452-458 are displayed on user interface 408. Element 452 is the text "Given Name," displayed next to a text field. Element 454 is the text "Family Name," displayed next to another text field. Element 456 is the text "Weight," displayed next to another text field. Element 458 is a button labeled with the text "Confirm."

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
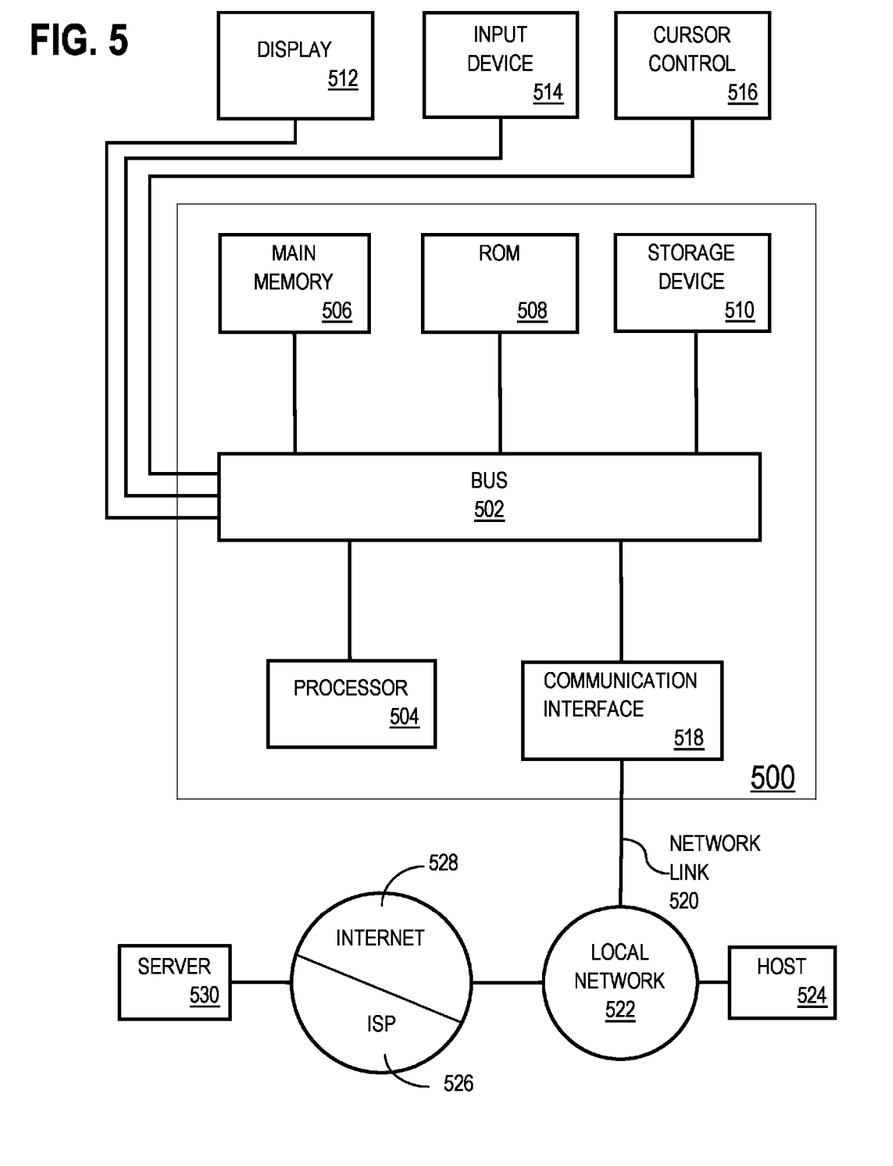
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first version of a master application comprising a first version of an inclusion application;
   identifying a modified version of the inclusion application generated at least by modifying each of a first asset and a second asset of the first version of the inclusion application;
   identifying a customized version of the master application, wherein:
      the customized version of the master application includes a customized version of the inclusion application,
      the customized version of the inclusion application is generated at least by customizing the second asset of the first version of the inclusion application without customizing the first asset of the first version of the inclusion application,
      the second asset of the customized version of the inclusion application is different than the second asset of the modified version of the inclusion application;
   generating a merged version of the inclusion application, including (a) the first asset from the modified version of the inclusion application, and (b) the second asset from the customized version of the inclusion application; and
   generating a modified version of the master application including the merged version of the inclusion application.

2. The medium of claim 1, wherein the operations further comprise:
   prior to generating the modified version of the master application:
      displaying, at a user interface, a proposal to generate the modified version of the master application including the merged version of the inclusion application, the merged version of the inclusion application including (a) the first asset from the modified version of the inclusion application, and (b) the second asset from the customized version of the inclusion application.

3. The medium of claim 1, wherein the operations further comprise:
   prior to generating the modified version of the master application:
      displaying, at a user interface, a first option to generate the modified version of the master application including the merged version of the inclusion application, the merged version of the inclusion application including (a) the first asset from the modified version of the inclusion application and (b) the second asset from the customized version of the inclusion application;
      displaying, at the user interface, a second option to generate another version of the master application including the first version of the inclusion application; and
      receiving user input selecting the first option.

4. The medium of claim 1, wherein the operations further comprise:

receiving a query for any differences between (a) the customized version of the inclusion application in the customized version of the master application and (b) the modified version of the inclusion application; and displaying, at a user interface, the differences between (a) the customized version of the inclusion application in the customized version of the master application and (b) the modified version of the inclusion application.

5. The medium of claim 1, wherein the operations further comprise:

displaying, at a user interface, a first option to modify the customized version of the master application to include the modified version of the inclusion application, by replacing the customized version of the inclusion application with the modified version of the inclusion application; and displaying, at the user interface, a second option to modify the customized version of the master application to include the first version of the inclusion application, by replacing the customized version of the inclusion application with the first version of the inclusion application.

6. The medium of claim 1, wherein the first asset comprises one or more of a user interface (UI) style, a rule, and a screen definition.

7. The medium of claim 1, wherein the operations further comprise:

identifying a first version of a second master application comprising the first version of the inclusion application;

identifying a customized version of the second master application, wherein:
the customized version of the second master application includes a second customized version of the inclusion application,
the second customized version of the inclusion application is generated at least by customizing the second asset of the first version of the inclusion application without customizing the first asset of the first version of the inclusion application,
the second asset of the second customized version of the inclusion application is different than both the second asset of the modified version of the inclusion application and the second asset of the customized version of the inclusion application;

generating a second merged version of the inclusion application, including (a) the first asset from the modified version of the inclusion application, and (b) the second asset from the second customized version of the inclusion application;

generating a modified version of the second master application including the second merged version of the inclusion application.

8. The medium of claim 1, wherein the operations further comprise:

receiving a request to update the master application that is stored at a shared repository, wherein the request includes the customized version of the master application; and storing the modified version of the master application at the shared repository.

9. The medium of claim 1, wherein the modified version of the inclusion application is identified from a shared repository.

10. The medium of claim 1, wherein a shared repository concurrently stores (a) the modified version of the inclusion application and (b) the merged version of the inclusion application within the modified version of the master application.

11. The medium of claim 1, wherein:

the first asset comprises one or more of a user interface (UI) style, a rule, and a screen definition;

a shared repository concurrently stores (a) the modified version of the inclusion application and (b) the merged version of the inclusion application within the modified version of the master application the operations further comprise:
prior to identifying the customized version of the master application:
receiving a request to update the master application that is stored at the shared repository, wherein the request includes the customized version of the master application;

prior to generating the modified version of the master application:
displaying, at a user interface, a first option to generate the modified version of the master application including the merged version of the inclusion application, the merged version of the inclusion application including (a) the first asset from the modified version of the inclusion application and (b) the second asset from the customized version of the inclusion application;
displaying, at the user interface, a second option to generate another version of the master application including the first version of the inclusion application; and
receiving user input selecting the first option;

storing the modified version of the master application at the shared repository;

identifying a first version of a second master application comprising the first version of the inclusion application;

identifying a customized version of the second master application, wherein:
the customized version of the second master application includes a second customized version of the inclusion application,
the second customized version of the inclusion application is generated at least by customizing the second asset of the first version of the inclusion application without customizing the first asset of the first version of the inclusion application,
the second asset of the second customized version of the inclusion application is different than both the second asset of the modified version of the inclusion application and the second asset of the customized version of the inclusion application;

generating a second merged version of the inclusion application, including (a) the first asset from the modified version of the inclusion application, and (b) the second asset from the second customized version of the inclusion application; and generating a modified version of the second master application including the second merged version of the inclusion application.

12. A system comprising:
at least one device including a hardware processor; and
the system configured to perform operations comprising:
identifying a first version of a master application comprising a first version of an inclusion application;

identifying a modified version of the inclusion application generated at least by modifying each of a first asset and a second asset of the first version of the inclusion application;

identifying a customized version of the master application, wherein:
the customized version of the master application includes a customized version of the inclusion application,
the customized version of the inclusion application is generated at least by customizing the second asset of the first version of the inclusion application without customizing the first asset of the first version of the inclusion application,
the second asset of the customized version of the inclusion application is different than the second asset of the modified version of the inclusion application;

generating a merged version of the inclusion application, including (a) the first asset from the modified version of the inclusion application, and (b) the second asset from the customized version of the inclusion application; and generating a modified version of the master application including the merged version of the inclusion application.

13. A non-transitory computer readable medium comprising instructions which, when executed by one or more hardware processors, causes performance of operations comprising:

identifying a first version of a master application comprising a first version of an inclusion application;

identifying a modified version of the inclusion application generated at least by modifying a first asset of the first version of the inclusion application and deleting a second asset of the first version of the inclusion application;

identifying a customized version of the master application, wherein:
the customized version of the master application includes a customized version of the inclusion application,
the customized version of the inclusion application is generated without customizing the first asset of the first version of the inclusion application;
the customized version of the master application depends on the second asset of the customized version of the inclusion application;

generating a merged version of the inclusion application, including: (a) the first asset from the modified version of the inclusion application and (b) the second asset from the customized version of the inclusion application;

generating a modified version of the master application including the merged version of the inclusion application.

14. The medium of claim 13, wherein:
the modified version of the inclusion application is generated without modifying a third asset of the first version of the inclusion application;
the customized version of the inclusion application is generated at least by deleting the third asset of the first version of the inclusion application;

the customized version of the master application includes a second inclusion application that includes the third asset; and
the merged version of the inclusion application further includes the third asset from the second inclusion application.

15. The medium of claim 13, wherein:
the modified version of the inclusion application is generated at least by deleting a third asset of the first version of the inclusion application;
the customized version of the inclusion application is generated at least by customizing the third asset of the first version of the inclusion application; and
the merged version of the inclusion application does not include the third asset from the customized version of the inclusion application.

16. The medium of claim 13, wherein the operations further comprise:
prior to generating the modified version of the master application:
displaying, at a user interface, a proposal to generate the modified version of the master application including the merged version of the inclusion application, the merged version of the inclusion application including (a) the first asset from the modified version of the inclusion application, and (b) the second asset from the customized version of the inclusion application.

17. The medium of claim 13, wherein the operations further comprise:
prior to generating the modified version of the master application:
displaying, at a user interface, a first option to generate the modified version of the master application including the merged version of the inclusion application, the merged version of the inclusion application including (a) the first asset from the modified version of the inclusion application and (b) the second asset from the customized version of the inclusion application;
displaying, at the user interface, a second option to generate another version of the master application including the first version of the inclusion application; and
receiving user input selecting the first option.

18. The medium of claim 13, wherein the operations further comprise:
receiving a request to store the master application at a shared repository, wherein the request includes the customized version of the master application; and
storing the modified version of the master application at the shared repository.

19. The medium of claim 13, wherein the modified version of the inclusion application is identified from a shared repository.

20. The medium of claim 13, wherein a shared repository concurrently stores (a) the modified version of the inclusion application and (b) the merged version of the inclusion application within the modified version of the master application.

* * * * *

UNITED STATES PATENT AND TRADEMARK OFFICE
CERTIFICATE OF CORRECTION

PATENT NO. : 9,921,828 B2  
APPLICATION NO. : 15/269124  
DATED : March 20, 2018  
INVENTOR(S) : Barry et al.

Page 1 of 1

It is certified that error appears in the above-identified patent and that said Letters Patent is hereby corrected as shown below:

In the Specification

In Column 7, Line 52, delete "application The" and insert -- application. The --, therefor.

In Column 8, Line 53, delete "application. the" and insert -- application. The --, therefor.

Signed and Sealed this  
Twenty-first Day of August, 2018

Andrei Iancu  
*Director of the United States Patent and Trademark Office*